Patented May 10, 1949

2,469,684

UNITED STATES PATENT OFFICE 2,469,684

ANION ACTIVE RESINS AND PROCESSES OF PRODUCING THE SAME

James R. Dudley, Cos Cob, Conn., assignor to American Cyanamid Company, New York, N. Y., a corporation of Maine No Drawing. Application March 16, 1946, Serial No. 655,005

8 Claims. (Cl. 260—2)

This invention relates to resins suitable for the removal of anions from liquid media and to processes of purifying liquid media by means of such resins.

An object of the present invention is to provide a resinous material which is insoluble in water and which is suitable for removing anions from water and other liquid media.

Another object of the present invention is to provide an improved process for removing anions from water and other liquid media.

Still another object of the present invention is to prepare an anion active resin from a polyepoxy compound and a polyamine.

A further object of the present invention is to provide a process of producing resinous materials suitable for the removal of anions from liquid media.

These and other objects may be attained by condensing a polyepoxy organic compound, e. g. bis-(2,3-epoxypropyl) sulfide, with an alkylene polyamine and by contacting a liquid containing anions with the insoluble resin so prepared.

The following examples, in which the proportions are given in parts by weight unless otherwise indicated, are merely illustrative and not intended to restrict the scope of the invention to the details set forth.

EXAMPLE 1

|  | Parts |
|---|---|
| Tetraethylenepentamine (0.5 mol) | 94.5 |
| Bis-(2,3-epoxypropyl) sulfide (1 mol) | 146 |
| Water | 350 |

To a solution of the tetraethylenepentamine in the water, there is added the bis-(2,3-epoxypropyl) sulfide. An exothermic reaction ensues, during which the temperature rises rapidly to 60° C. At this point the syrup gels, and the temperature continues to rise to 81° C. before subsiding. The gel is heated for an hour by steam and is then broken up and cured at 100° C. for 17 hours. The cured resin is granulated and screened to between 8 and 60 mesh on a U. S. Standard screen. It has a capacity of 15.8 kilograins of calcium carbonate per cubic foot of resin and a density of 15.5 lbs./cu. ft.

EXAMPLE 2

|  | Parts |
|---|---|
| Tetraethylenepentamine (0.5 mol) | 94.5 |
| Bis-(2,3-epoxypropyl) sulfide (1.5 mols) | 219 |
| Water | 350 |

The procedure of Example 1 is followed. Gelation occurs almost at once upon mixing of ingredients, and a strong exothermic reaction occurs simultaneously. When the temperature has subsided, the gel is treated as in Example 1 and the cured resin found to have a capacity of 6.5 kilograins of calcium carbonate per cubic foot of resin and a density of 21.7 lbs./cu. ft.

EXAMPLE 3

|  | Parts |
|---|---|
| Tetraethylenepentamine (0.2 mol) | 38.9 |
| Bis-(2,3-epoxypropyl) ether (0.6 mol) | 80 |
| Water | 40 |

The procedure of Example 1 is followed. An exothermic reaction takes place with almost immediate gelation to give a clear light orange rigid gel which, when granulated and cured, has a good capacity for removing anions from solution.

Preparation of bis-(2,3-epoxypropyl) sulfide

|  | Parts |
|---|---|
| Epichlorohydrin (0.42 mol) | 38.8 |
| Sodium sulfide monohydrate (2 mols) | 480.4 |
| Water | 1000 |

The epichlorohydrin is placed in a flask equipped with a mechanical stirrer and cooled by means of an ice-salt mixture to 0° C. A solution of the sodium sulfide monohydrate in the water is added throughout a three-hour period at such a rate that the temperature is maintained below 5° C. Within 15 minutes after completion of the addition, the resulting turbid two-phase reaction mixture is extracted successively with 350, 177, and 106 parts of ether. The ether extracts are combined and dried over 200 parts of anhydrous sodium sulfate which is separated by filtration after standing for about 12 hours at 0° C.

After the ether and a small amount of low boiling material is removed from the dried ether extracts by distillation under reduced pressure, the bis-(2,3-epoxypropyl) sulfide is recovered from the residue by distillation, a portion thereof which has a boiling point of 84° C. at 1 mm. Hg giving the following analytical data:

|  | Percent C | Percent H | Percent S |
|---|---|---|---|
| Calc. for $C_6H_{10}O_2S$ | 49.31 | 6.85 | 21.9 |
| Found | 48.85 | 6.93 | 22.37 |
|  | 48.86 | 7.01 | 22.66 |

Preparation of bis-(2,3-epoxypropyl) ether

|  | Parts |
|---|---|
| Epichlorohydrin (0.7 mol) | 64.8 |
| Glycerol monochlorohydrin (0.71 mol) | 78.1 |
| Sodium hydroxide (1.68 mols) | 67.2 |
| Water | 100 |
| Benzene | 242 |
| Concentrated sulfuric acid | 1.8 |

The epichlorohydrin is added over a period of 2½ hours to the glycerol monochlorohydrin containing the sulfuric acid while the reaction mixture is heated with steam. Heating is continued for 3 hours after the addition is complete, and the syrup is allowed to stand for 12 hours. It is then added to 176 parts of the benzene and the resulting solution chilled by means of an ice-salt mixture to below 0° C. A solution of the sodium hydroxide in the water is then added over a period of 1¾ hours during which addition the temperature is maintained below 5° C. The reaction mixture is agitated for a half hour after the addition is complete, and it is then filtered to remove the sodium chloride which forms. The benzene layer is separated and the aqueous layer extracted with 66 parts of the benzene.

The benzene extracts are combined and after removing the benzene by distillation under reduced pressure, bis-(2,3-epoxypropyl) ether is obtained from the residue by further distillation, it having a boiling point of 96°-97° C. at 9 mm. Hg.

Other polyalkylene polyamines may be substituted for part or all of the tetraethylenepentamine used in the preceding examples. Furthermore, mixtures of two, three, four, five, seven or any other number of polyamines may be employed. Minor molar proportions of the polyalkylene polyamine may be replaced with ammonia or mono- or polyamines other than the alkylene polyamines. Preferably, however, polyalkylene polyamines are employed exclusively.

Examples of suitable polyamines include 1,3-diaminopropane, 1,4-diamino-n-butane, 1,3-diamino-n-butane, 1,5-diamino-n-pentane, 1,6-diamino-n-hexane, 1,10-diamino-n-decane, 1,6-diamino-3-methyl-n-hexane, 3,3'-diamino-dipropyl ether and other similar diamines containing hetero atoms in the chains separating the amino groups, triethylene tetramine, pentaethylene hexamine, all of the higher homologs thereof containing additional —CH₂CH₂NH— groups in the chain between the primary amino groups, etc. Complex mixtures of polyethylene polyamines of high molecular weight obtained by the addition of large numbers of molecules of ammonia to ethylene dibromide or ethylene dichloride and the like may be used.

Instead of bis-(2,3-epoxypropyl) sulfide and bis-(2,3-epoxypropyl) ether, other polyepoxy organic compounds are suitable for reaction with polyamines in accordance with this invention to produce anion active resins.

Some of these polyepoxy compounds are, for example:

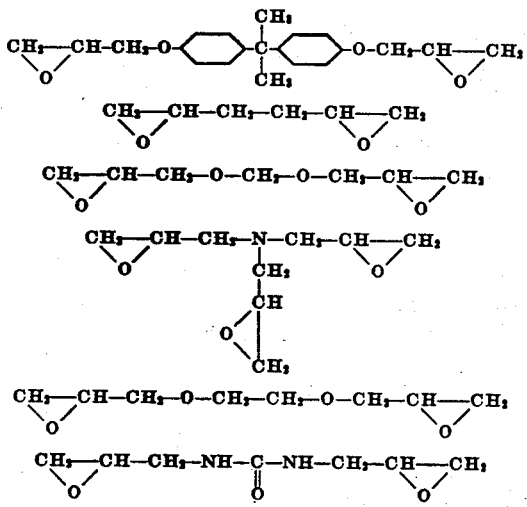

A minor proportion of the polyepoxy compound may be replaced in the reaction with a polyamine by the alpha-chloro-beta-epoxy organic compounds described and claimed in the copending application of James R. Dudley and Lennart A. Lundberg, Serial No. 616,644 filed September 15, 1945, and/or by the hydroxy aliphatic polyhalides described in the Lennart A. Lundberg application Serial No. 624,606 filed October 25, 1945.

It is desirable that the molar ratio of the polyepoxy compound to the polyamine be about 2:1 to 3:1. While proportions of the polyepoxy compound larger than those mentioned may be used if desired, this will generally be undesirable since a reduction in the capacity of the resins often results.

The condensation of the polyepoxy compound and the polyamine may be carried out in the presence of any desired solvent such as water, methanol, ethanol, the monomethyl- or monoethyl-ethers of ethylene, glycol, etc., so long as the solvent does not react with the reactants or with the reaction products. While it is convenient to add the polyepoxy compound to the polyamine, the order of addition may be reversed and moreover, all reactants may be combined simultaneously. It is immaterial whether all of the polyepoxy compound be introduced at once or whether it be introduced stepwise.

The reaction may be carried out at ordinary room temperatures and/or at elevated temperatures, the speed with which the reactants are mixed being controlled accordingly to avoid the difficulties which may arise in overheating. These difficulties are practical ones due to the exothermicity of the reaction such as rapid boiling of the reaction mixture, loss of the reaction materials by vaporization, etc. In other words, the reaction temperature is not critical and therefore the temperature may be varied from 0° C. up to about 100° C. or even higher.

The final heat-treatment or curing of the resin in accordance with my invention is preferably carried out at a temperature of about 95°-105° C. in dry heat although other conditions may be used including temperatures of 50° C. up to 125° C. or higher.

The anion active resins of the present invention may be activated or regenerated by means of dilute alkaline solutions, such as for example, 0.1–10% aqueous solutions of sodium hydroxide, sodium carbonate, etc.

It is preferable to grind and screen the resins to a particle size of from about 8–60 mesh. Use of larger particles causes channeling, and smaller particles of resin have been found to pack, thus reducing the anion exchange efficiency of the material.

The resinous materials produced in accordance with this invention are suitable for the removal of all kinds of acids and anions in general from liquid media. They may be used to extract the strong mineral acids (preferably in relatively low concentrations), organic acids such as acetic acid, oxalic acid, etc., from water and organic liquids. The anions of salts such as the chloride ion of ammonium chloride, or the sulfate ion of ammonium sulfate may be removed by means of the resinous products described herein.

The anion active resins are useful for many purposes, examples of which are the removal of acid from water, the removal of acid from alcoholic solutions, the purification of aqueous solutions containing sugar including sugar juices, the purification of pectin, the removal of acid from aqueous formaldehyde solutions, etc.

While the resins are especially suitable for the removal of anions from aqueous media, they may be used to extract acids or anions from liquid media other than water, and they may even be used for the extraction of acids from gases. The resins may be used as absorbents for plant nutrients and as such may be used as media for growing plants or as means for applying nutrients to the soil.

To be sufficiently insoluble for practical use in the water purification art, resins should have a sufficiently low solubility so that they will not be dissolved very rapidly by the solution to be treated. Thus, water should not dissolve more than 1 part of resin in 1000 parts of water when passed through a bed of resin after the first cycle comprising an activation, exhaustion and reactivation of the resin.

This application is a continuation-in-part of the James R. Dudley and Lennart A. Lundberg application, Serial No. 616,644, filed September 15, 1945.

I claim:

1. A resinous material as in claim 3 wherein the polyamine is a polyethylene polyamine containing an unsubstituted primary amino group.

2. A resinous material as in claim 3 wherein the polyamine is tetraethylenepentamine.

3. An insoluble granular resinous material obtained by a process comprising the steps of reacting an alkylene polyamine containing an unsubstituted primary amino group with an organic compound containing a plurality of ethylene oxide groups and no solubilizing substituents in molar proportions of from 2:1 to 3:1, ethylene oxide group containing compound to alkylene polyamine, permitting the resulting condensation product to gel, curing the resulting gel by heating, and granulating the cured gel, said material being so insoluble that no more than one part thereof will dissolve in 1,000 parts of water after a first cycle comprising an activation, exhaustion, and reactivation of the material.

4. An insoluble granular resinous material obtained by a process comprising the steps of reacting tetraethylenepentamine with bis-(2,3-epoxypropyl) sulfide in molar proportions of from 2:1 to 3:1, bis-(2,3-epoxypropyl) sulfide to tetraethylene pentamine, permitting the resulting condensation product to gel, curing the resulting gel by heating and granulating the cured gel, said material being so insoluble that no more than one part thereof will dissolve in 1,000 parts of water after a first cycle comprising an activation, exhaustion, and reactivation of the material.

5. An insoluble granular resinous material obtained by a process comprising the steps of reacting tetraethylenepentamine with bis-(2,3-epoxypropyl) ether in molar proportions of from 2:1 to 3:1, bis-(2,3-epoxypropyl) ether to tetraethylene pentamine, permitting the resulting condensation product to gel, curing the resulting gel by heating and granulating the cured gel, said material being so insoluble that no more than one part thereof will dissolve in 1,000 parts of water after a first cycle comprising an activation, exhaustion, and reactivation of the material.

6. A process of preparing a granular, resinous material so insoluble that no more than one part thereof will dissolve in 1,000 parts of water after a first cycle comprising an activation, exhaustion, and a reactivation of the material which comprises reacting an alkylene polyamine containing an unsubstituted primary amino group with an organic compound containing a plurality of ethylene oxide groups and no solubilizing substituents in molar proportions of from 2:1 to 3:1, ethylene oxide group containing compound to alkylene polyamine to form a gel, heating the gel thus obtained, and granulating the heated gel.

7. A process of preparing a granular, resinous material so insoluble that no more than one part thereof will dissolve in 1,000 parts of water after a first cycle comprising an activation, exhaustion, and a reactivation of the material which comprises reacting a polyalkylene polyamine containing an unsubstituted primary amino group with bis-(2,3-epoxypropyl) sulfide in molar proportions of from 2:1 to 3:1, bis-(2,3-epoxypropyl) sulfide to polyalkylene polyamine to form a gel, heating the gel thus obtained and granulating the heated gel.

8. A process of preparing a granular, resinous material so insoluble that no more than one part thereof will dissolve in 1,000 parts of water after a first cycle comprising an activation, exhaustion, and a reactivation of the material which comprises reacting a polyalkylene polyamine containing an unsubstituted primary amino group with bis-(2,3-epoxypropyl) ether in molar proportions of from 2:1 to 3:1, bis-(2,3-epoxypropyl) ether to polyalkylene polyamine to form a gel, heating the gel thus obtained and granulating the heated gel.

JAMES R. DUDLEY.

REFERENCES CITED

The following references are of record in the file of this patent:

UNITED STATES PATENTS

| Number | Name | Date |
| --- | --- | --- |
| 1,977,253 | Stallmann | Oct. 16, 1934 |
| 2,136,928 | Schlack | Nov. 15, 1938 |
| 2,228,514 | Griessbach | Jan. 14, 1941 |
| 2,259,169 | Little | Oct. 14, 1941 |
| 2,388,235 | Bowman | Nov. 6, 1945 |

FOREIGN PATENTS

| Number | Country | Date |
| --- | --- | --- |
| 771,836 | France | Aug. 16, 1934 |

OTHER REFERENCES

In Badger and McCable, Elements of Chemical Engineering, pages 558–559 (1936), McGraw-Hill Book Co., N. Y.